United States Patent
Li et al.

(10) Patent No.: US 10,313,083 B2
(45) Date of Patent: Jun. 4, 2019

(54) METHOD FOR HYBRID AUTOMATIC REPEAT REQUEST PROCESS, NETWORK DEVICE AND TERMINAL DEVICE

(71) Applicant: Telefonaktiebolaget LM Ericsson (publ), Stockholm (SE)

(72) Inventors: Gen Li, Beijing (CN); Jinhua Liu, Beijing (CN); Cong Shi, Beijing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 21 days.

(21) Appl. No.: 15/543,956

(22) PCT Filed: Jun. 8, 2017

(86) PCT No.: PCT/CN2017/087565
§ 371 (c)(1),
(2) Date: Jul. 14, 2017

(87) PCT Pub. No.: WO2018/059004
PCT Pub. Date: Apr. 5, 2018

(65) Prior Publication Data
US 2018/0331808 A1   Nov. 15, 2018

(30) Foreign Application Priority Data
Sep. 30, 2016 (WO) ............... PCT/CN2016/101068

(51) Int. Cl.
*G06F 9/30* (2018.01)
*H04L 5/00* (2006.01)
(Continued)

(52) U.S. Cl.
CPC .......... *H04L 5/0055* (2013.01); *H04L 1/1812* (2013.01); *H04L 1/1835* (2013.01); *H04L 1/1887* (2013.01); *H04W 8/24* (2013.01)

(58) Field of Classification Search
None
See application file for complete search history.

(56) References Cited

U.S. PATENT DOCUMENTS

2006/0092972 A1   5/2006   Petrovic et al.
2006/0092973 A1*  5/2006   Petrovic ............... H04L 1/1822
                                                       370/469
(Continued)

FOREIGN PATENT DOCUMENTS

CN   101965707 A   2/2011
CN   104901900 A   9/2015

OTHER PUBLICATIONS

Ericsson et al., "Further views on soft buffer handling for Rel-10 UEs," R1-111100, 3GPP TSG RAN WG1 Meeting #64, Feb. 21-25, 2011, 2 pages.
(Continued)

*Primary Examiner* — Sithu Ko
(74) *Attorney, Agent, or Firm* — NDWE LLP

(57) ABSTRACT

A method in a network device for hybrid automatic repeat request (HARQ) processes, the method comprising receiving from a terminal device one or more data processing capacity indications indicating one or more data processing capabilities of the terminal device; estimating the number of available soft buffers in the terminal device; and scheduling hybrid automatic repeat request (HARQ) data according to the estimated number.

12 Claims, 5 Drawing Sheets

(51) Int. Cl.
    *H04L 1/18*           (2006.01)
    *H04W 8/24*         (2009.01)

(56)             References Cited

U.S. PATENT DOCUMENTS

| | | | |
|---|---|---|---|
| 2010/0050034 A1* | 2/2010 | Che | H04L 1/1845 |
| | | | 714/748 |
| 2010/0312994 A1* | 12/2010 | McBeath | H04L 1/1822 |
| | | | 712/220 |
| 2014/0133471 A1* | 5/2014 | Nammi | H04L 1/0025 |
| | | | 370/336 |
| 2014/0235256 A1 | 8/2014 | Takeda et al. | |
| 2015/0103752 A1* | 4/2015 | Yu | H04L 49/9005 |
| | | | 370/329 |
| 2016/0088635 A1 | 3/2016 | Davydov et al. | |
| 2016/0218996 A1* | 7/2016 | Gerstenberger | H04L 1/1835 |
| 2016/0241362 A1* | 8/2016 | El-Khamy | H04L 1/1835 |

OTHER PUBLICATIONS

International Search Report and Written Opinion for Application No. PCT/CN2017/087565, dated Aug. 30, 2017, 11 pages.
Samsung, "UE soft buffer management in case of more than 8 HARQ processes," 3GPP TSG-RAN WG2 Meeting #77, R2-120236, Feb. 6-10, 2012, 4 pages.
Ericsson, "HSDPA Hybrid ARQ Protocol Proposal," 3GPP Draft, TSG-RAN AH HSDPA, R2-011842, Aug. 27-31, 2001, 4 pages.
Extended European Search Report for Application No. 17734969.3, dated Oct. 11, 2018, 10 pages.

* cited by examiner

METHOD FOR HYBRID AUTOMATIC REPEAT REQUEST PROCESS, NETWORK DEVICE AND TERMINAL DEVICE

CROSS-REFERENCE TO RELATED APPLICATIONS

This application is a National stage of International Application No. PCT/CN2017/087565, filed Jun. 8, 2017, which claims priority to International Application No. PCT/CN2016/101068, filed Sep. 30, 2016, which are hereby incorporated by reference.

TECHNICAL FIELD

The present disclosure relates to a wireless communication technology, and more particularly, to methods for hybrid automatic repeat request (HARQ) process, a network device, a terminal device, and a system.

BACKGROUND

Leading operators and vendors in the Next Generation Mobile Network (NGMN) Alliance are expecting various applications and services to be provided by the fifth generation (5G) network. The 5G network, also been named NR (New Radio) will support a huge amount of applications and services having different performance attributes from delay-sensitive video applications to ultra-low latency real-time applications, from entertainment applications in high-speed vehicles to mobility on demand applications for connected objects, and from best-effort applications to reliable or ultra-reliable applications such as health and security.

In the 4G, namely LTE (Long Term Evolution), network, HARQ (hybrid automatic repeat request) is employed for error detection and correction. In a standard ARQ (automatic repeat request) method, error detection bits are added to data to be transmitted. In Hybrid ARQ, error correction bits are also added. When the receiver receives a data transmission, the receiver uses the error detection bits to determine if data has been lost. If it has, then the receiver may be able to decode and use the error correction bits for recovering the lost data. If the receiver is not able to recover the lost data using the error correction bits, then the receiver may use a second transmission of additional data, including more error correction information, to recover the data. Error correction can be performed by combining information from the initial transmission with additional information from one or more subsequent retransmissions.

FIG. 1 shows an illustration for procedure and soft buffer utility of HARQ. As shown, When UE (user equipment, such as smartphones) receives data from eNB (evolved Node B, namely base station), it will check which HARQ process the data block that is assigned for the data block and then put the received soft information in corresponding soft buffer, which is a part of memory in user equipment. If the data is decoded successfully based on the soft information, the UE will submit the data to upper layer and the soft information is not useful anymore. Otherwise, the soft information should be kept in the soft buffer to wait for combining with that from a retransmission.

Note that in LTE systems, typically each HARQ process has one specific soft buffer of fixed size. However, NR systems which may operate on high frequency bands, are emerging as a promising technology for meeting the exploding bandwidth requirements by enabling multi-Gbps speeds. At such high frequencies, wider channel bandwidth (e.g. 1 GHz) will be the case and thus larger transmission block size needs to be supported.

For NR systems with wider bandwidth, the size of maximum transport block will be much larger than that for LTE. To make simple calculation, the maximum channel bandwidth for LTE is 20 MHz. However, for NR this value may become 2 GHz, which means the required soft buffer size for each HARQ process may be 100 times as LTE if the same TTI length and numerology are used. Although NR may use shorter TTI and larger subcarrier space, the required soft buffer in UE side for one HARQ process is still significantly larger than that of LTE. As we know, soft buffer memory needs high speed Input Output (IO) capability and a large increase of soft buffer means a clear increase of UE cost. Furthermore, taking into possible carrier aggregation possibility, multi-subframe scheduling or multiple connectivity situations, the required soft buffer size for UEs in NR network becomes significantly larger which is not always acceptable.

Hence in NR network, it may be the case that there is not sufficient soft buffer, then efficient utility of the UE soft buffer shall be considered.

SUMMARY

It is an object of the present disclosure to provide methods for hybrid automatic repeat request (HARQ) process, a network device, and a terminal device, capable of increasing soft buffer use efficiency in UE side.

In a first aspect, a method in a network device for hybrid automatic repeat request (HARQ) processes is provided. The method comprises: receiving from a terminal device one or more data processing capacity indications indicating one or more data processing capabilities of the terminal device; estimating the number of available soft buffers in the terminal device; and scheduling hybrid automatic repeat request (HARQ) data according to the estimated number.

In an embodiment, the one or more data processing capacity indications comprises capacity indication indicating the number of soft buffers in the terminal device and capacity indication indicating the signal processing delay of the terminal device.

In a second aspect, a method in a terminal device for hybrid automatic repeat request (HARQ) processes is provided. The method comprises: sending to a network device one or more data processing capacity indications indicating one or more data processing capabilities of the terminal device; receiving hybrid automatic repeat request (HARQ) data; allocating the hybrid automatic repeat request (HARQ) data to available soft buffers in the terminal device.

In a third aspect, a network device for hybrid automatic repeat request (HARQ) processes is provided. The network device comprises a processor and a memory, said memory containing instructions executable by said processor and the processor is configured to: receiving from a terminal device one or more data processing capacity indications indicating one or more data processing capabilities of the terminal device; estimating the number of available soft buffers in the terminal device; and scheduling hybrid automatic repeat request (HARQ) data according to the estimated number.

In a fourth aspect, a terminal device for hybrid automatic repeat request (HARQ) processes is provided, the terminal device comprises a processor and a memory, said memory containing instructions executable by said processor and the processor is configured to: sending to a network device one or more data processing capacity indications indicating one or more data processing capabilities of the terminal device; receiving hybrid automatic repeat request (HARQ) data; allocating the hybrid automatic repeat request (HARQ) data to available soft buffers in the terminal device.

In a fifth aspect, a system in network for hybrid automatic repeat request (HARQ) processes is provided. The system comprises a network device and a terminal device, wherein the network device comprises a processor and a memory, said memory containing instructions executable by said processor and the processor is configured to: receiving from a terminal device one or more data processing capacity indications indicating one or more data processing capabilities of the terminal device; estimating the number of available soft buffers in the terminal device; and scheduling hybrid automatic repeat request (HARQ) data according to the estimated number; and wherein the terminal device comprises a processor and a memory, said memory containing instructions executable by said processor and the processor is configured to: sending to a network device one or more data processing capacity indications indicating one or more data processing capabilities of the terminal device; receiving hybrid automatic repeat request (HARQ) data; allocating the hybrid automatic repeat request (HARQ) data to available soft buffers in the terminal device.

In a sixth aspect, a computer readable medium is provided. The computer readable medium stores computer program instructions which, when executed on a processor in a network device, cause the network device to perform the method according to the above first aspect.

In a seventh aspect, a computer readable medium is provided. The computer readable medium stores computer program instructions which, when executed on a processor in a terminal device, cause the terminal device to perform the method according to the above second aspect.

With the embodiments of the present disclosure, the soft buffer size in UE side can be reduced while supporting the same number of HARQ processes by improving the utilization of soft buffer. The scheduling opportunity for a UE with soft buffer limit can be increased at facing HARQ process/soft buffer restriction, which can boost both the system and UE performances.

BRIEF DESCRIPTION OF THE DRAWINGS

The above and other objects, features and advantages will be more apparent from the following description of embodiments with reference to the figures, in which:

FIG. 7a is a figure illustrating a HARQ process/soft buffer reservation for soft information storage of not correctly decoded data of FIG. 3a.

DETAILED DESCRIPTION

The embodiments of the disclosure will be detailed below with reference to the drawings. It should be noted that the following embodiments are illustrative only, rather than limiting the scope of the disclosure.

Figure 2:
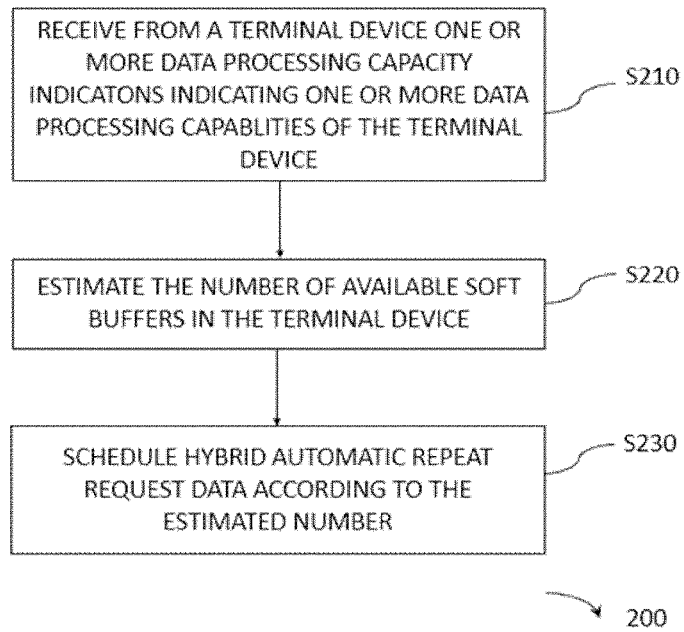
FIG. 2 is a flowchart illustrating a method for hybrid automatic repeat request (HARQ) process in a network device according to an embodiment of the present disclosure.

FIG. 2 is a flowchart illustrating a method 200 for hybrid automatic repeat request (HARQ) processes according to an embodiment of the present disclosure. The method 200 can be performed at a network device, such as a base station or an eNB.

At step S210, one or more data processing capacity indications indicating one or more data processing capabilities of a terminal device are received from the terminal device such as a smartphone. The one or more data processing capacity indications can comprise capacity indication indicating the number of soft buffers in the terminal device and capacity indication indicating the signal processing delay of the terminal device.

At step S220, the network device estimates the number of available soft buffers in the terminal device.

At step S230, the network device schedules hybrid automatic repeat request (HARQ) data according to the estimated number.

Figure 3A:
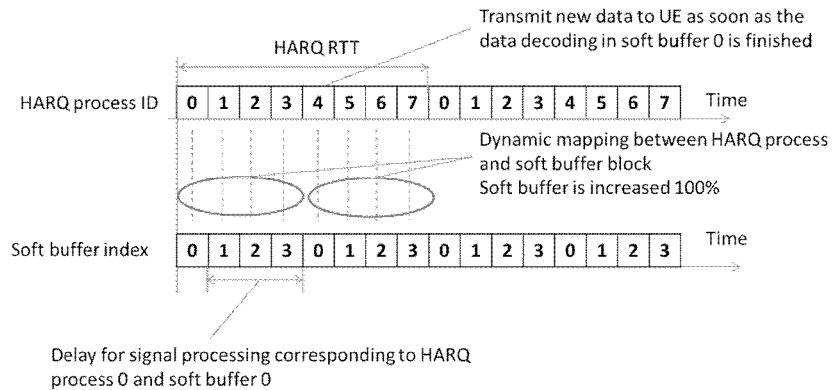
FIG. 3a is a figure illustrating the procedure and soft buffer utility of hybrid automatic repeat request (HARQ) according to an embodiment of the present disclosure.
Figure 3B:
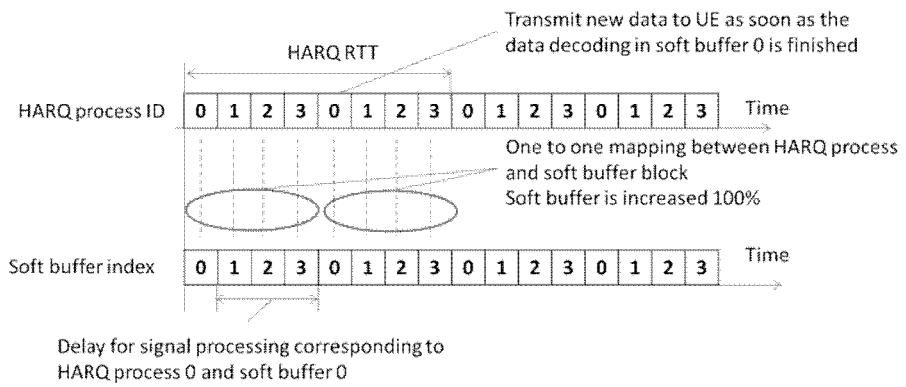
FIG. 3b is a figure illustrating the procedure and soft buffer utility of hybrid automatic repeat request (HARQ) according to another embodiment of the present disclosure.

In an example, the method 200 is detail described and showed by FIG. 3a and FIG. 3b, which illustrate the procedure and soft buffer utility of HARQ in NR (5G) network.

Firstly, UE will introduce dynamic tag for each memory part, namely soft buffer, instead of fixed tag for multiple HARQ process data. This requires that each soft buffer memory part should be released when the data is decoded successfully so that it could be used for other HARQ process data.

UE will send the number of soft buffers, for example the number is 4, and the signal processing delay of UE, for example the delay is 3 ms (millisecond), to eNB. The eNB receives them and sends out 4 HARQ process (process #0~#3) data according to the number 4. After that, the eNB estimates the number of available soft buffers in the UE, the buffer #0 could be available because the previous data for HARQ process data #0 is decoded successfully during the signal processing delay, which is 3 ms and equal to 3 TTIs (transmission time intervals). Therefore, the estimated number is 1 and then the eNB can schedule hybrid automatic repeat request (HARQ) data according to the estimated number. In other words, the eNB schedules data of HARQ process #4 and send it to the UE, and soft buffer #0 could be used for HARQ process data #4 when the previous data for HARQ process data #0 is decoded successfully.

Figure 1:
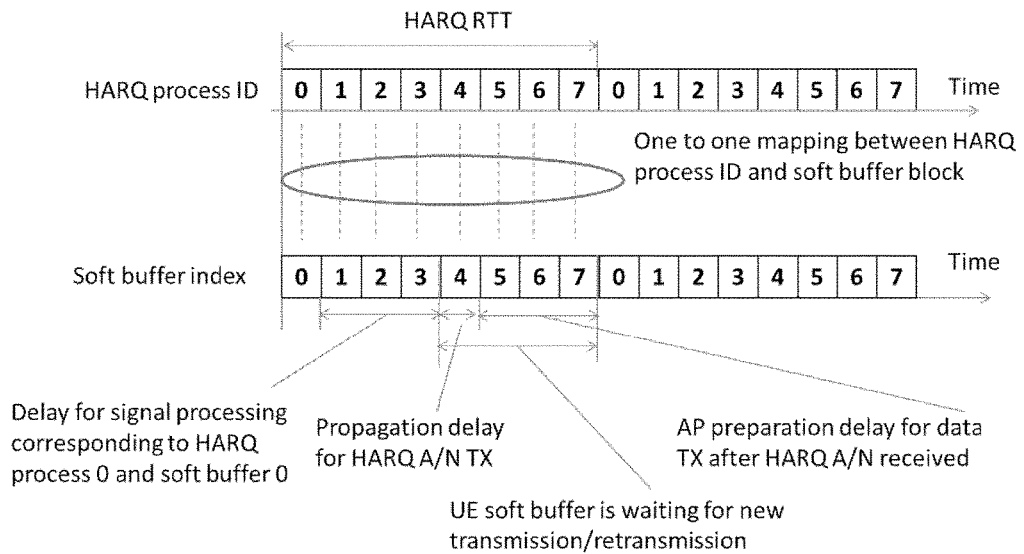
FIG. 1 is a figure illustrating the procedure and soft buffer utility of hybrid automatic repeat request (HARQ) in a LTE network.

As shown by FIG. 3a, by using this method, the soft buffer could be overused to support more number of HARQ process data. In this figure, there are 8 HARQ process data with only 4 HARQ soft buffers in the UE side. If following the traditional stop and wait procedure, a HARQ processes can only be recycled for data transmission/retransmission when the corresponding A/N (ACK/NACK signal) is received. Then the UE can only be scheduled with 4 data transmissions for every 8 TTIs (transmission time intervals) due to lack of soft buffers. By using the method of the embodiment in the present disclosure to overuse the soft buffer in the UE side, the eNB can schedule data transmission to the UE in every TTI. Compared to fixed buffer case in FIG. 1, the buffer utility is increased 100%. FIG. 3b is a figure illustrating the procedure and soft buffer utility of HARQ according to another embodiment of the present disclosure. In this case, there is an equal number of HARQ processes than that of soft buffer blocks, so it can be an one to one mapping relationship between the HARQ process and the soft buffer block. But the number of HARQ processes is not large enough to keep scheduling data transmission for the UE during one HARQ round trip time following the traditional stop and wait procedure. By overusing the HARQ process/soft buffer, the eNB can keep scheduling data transmission to the UE in every TTI within the HARQ RTT (Round Trip Time).

Figure 7A:
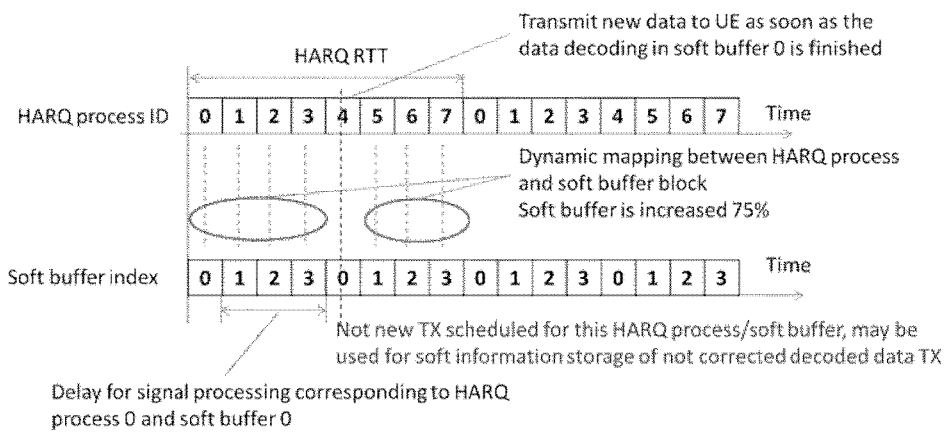
Figure 7B:
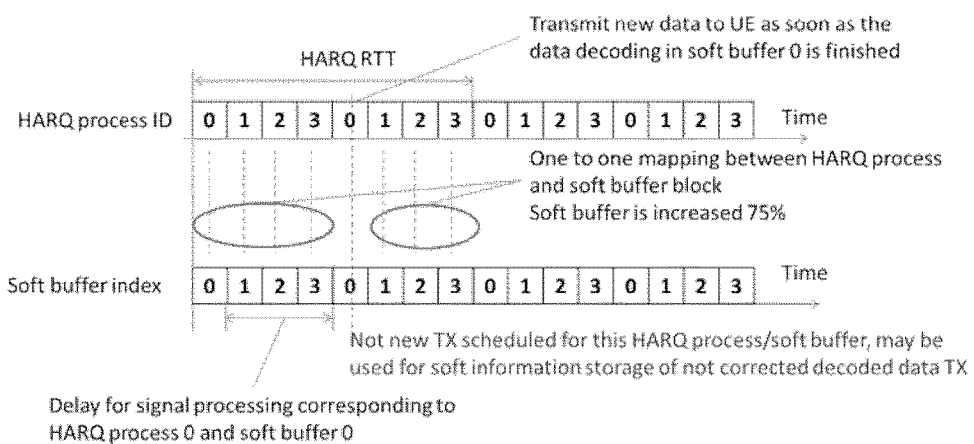
FIG. 7b is a figure illustrating a HARQ process/soft buffer reservation for soft information storage of not correctly decoded data of FIG. 3b.

As another embodiment, in order to achieve soft combing for not correctly detected data transmissions, the eNB can adjust the over using degree of HARQ processes/soft buffer so that the UE can have buffer to store the soft information of the not correctly decoded data block for future soft combining. FIG. 7a and FIG. 7b illustrate the examples to reserve one HARQ process/soft buffer for possible soft information storage of nacked data TX corresponding to FIG. 3a and FIG. 3b respectively.

As an option, eNB can estimate the soft buffer status in each UE waiting for scheduling and determine if a new HARQ process is scheduled. To this end, eNB can maintain a soft buffer status information for each scheduled UE, e.g. how many memory parts are left as empty.

Since there is feedback delay for ACK/NACK transmission, the soft buffer status information at eNB side is not the same as that at UE side. There may be different modes for HARQ process determination:

The first mode is conservative mode: eNB will only schedule a new HARQ process when there is for sure empty soft buffer known from eNB side.

The second mode is aggressive mode: the same thing is that eNB could schedule a new HARQ process when there is for sure empty soft buffer known from eNB side. The difference lies in the situation that eNB thinks there is no empty soft buffer status. But actually this is not the case at UE side since the feedback is not received at eNB side yet. In that case, eNB can first checks how many HARQ process is waiting for feedback. Then eNB can make a rough estimation the possibility for receiving ACK according to the error rate in a predefined previous time window or channel status. For example, if the number of waiting HARQ process is 4 and error rate is 10%, eNB may think $4*(1-10\%) \approx 3$ HARQ process will feedback ACK. Then the estimated empty HARQ process could be 3.

Different modes could be configured for different services or UEs. For instance, the UE/service which needs reliable transmission is preferred to configure as conservative mode.

Figure 4:
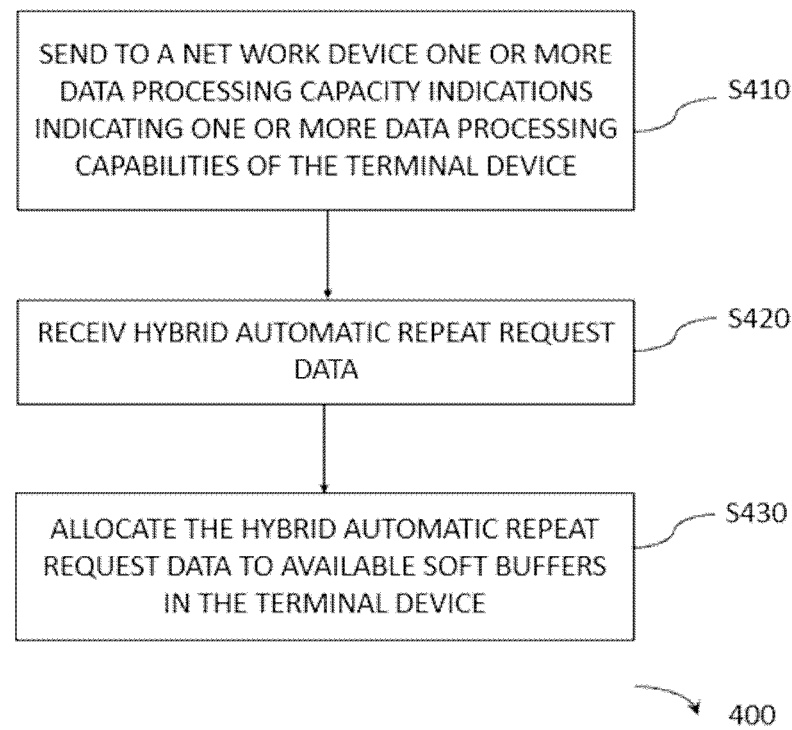
FIG. 4 is a flowchart illustrating a method for hybrid automatic repeat request (HARQ) processes according to another embodiment of the present disclosure.

FIG. 4 is a flowchart illustrating a method 400 for hybrid automatic repeat request (HARQ) processes according to another embodiment of the present disclosure. The method 400 can be performed at a terminal device, such as smartphone or other wireless terminal devices.

At step S410, one or more data processing capacity indications indicating one or more data processing capabilities of a terminal device are sent to a network device such as a base station or an eNB. The one or more data processing capacity indications can comprise capacity indication indicating the number of soft buffers in the terminal device and capacity indication indicating the signal processing delay of the terminal device.

At step S420, the terminal device receives hybrid automatic repeat request (HARQ) data from the network device.

At step S430, the terminal device allocates the hybrid automatic repeat request (HARQ) data to available soft buffers.

The terminal device, namely UE, can report the signal processing delay to the eNB so that the eNB can determine when the HARQ process/soft buffer is available for reuse without receiving the corresponding HARQ A/N feedback. The processing delay can be implicitly reported in UE capability reporting or explicitly reported via dedicated signaling.

The total soft buffer is divided into multiple memory parts which are dynamically used by different HARQ processes. The size of each part can meet the requirement to accommodate the maximum transport block size supported by the UE. In addition, the number of memory parts can be less than the maximum number of HARQ processes the UE can support.

As an option, the size for each divided memory parts could be different and dynamically changed.

As an option, the partitioning result of multiple memory parts (e.g. the size of soft buffer, number of divided memory parts or size of each memory part) is signaled to eNB so that eNB could have more information to determine how to schedule HARQ process for that UE.

As an option, when UE receives data from eNB, it will select one soft buffer from the released/empty memory parts if the size for each part is the same; or it will select the memory part feasible for the data according to the service type and transport block size. NR systems can be able to support various service type and thus the transport block size may vary too much. For example, if UE receives the data with smaller transport block size for machine type service, it is preferred to put the data in the memory part with smaller size.

As an option, UE can release the memory part as empty when the data for that process is decoded successfully. Then this released memory part could be used for data of other HARQ process.

Figure 5:
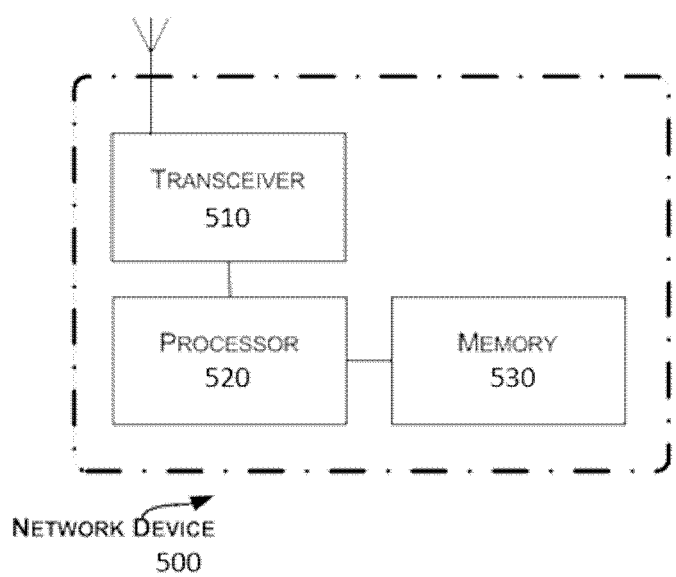
FIG. 5 is a block diagram of a network device for hybrid automatic repeat request (HARQ) processes according to an embodiment of the present disclosure.

FIG. 5 is a block diagram of a network device for hybrid automatic repeat request (HARQ) processes according to an embodiment of the present disclosure; The network device 500 can be provided for traffic steering. The network device 500 includes a transceiver 510, a processor 520 and a memory 530. The memory 5 contains instructions executable by the processor 520 whereby the network device 500 is operative to: receive from a terminal device one or more data processing capacity indications indicating one or more data processing capabilities of the terminal device; estimate the number of available soft buffers in the terminal device; and schedule hybrid automatic repeat request (HARQ) data according to the estimated number.

Figure 6:
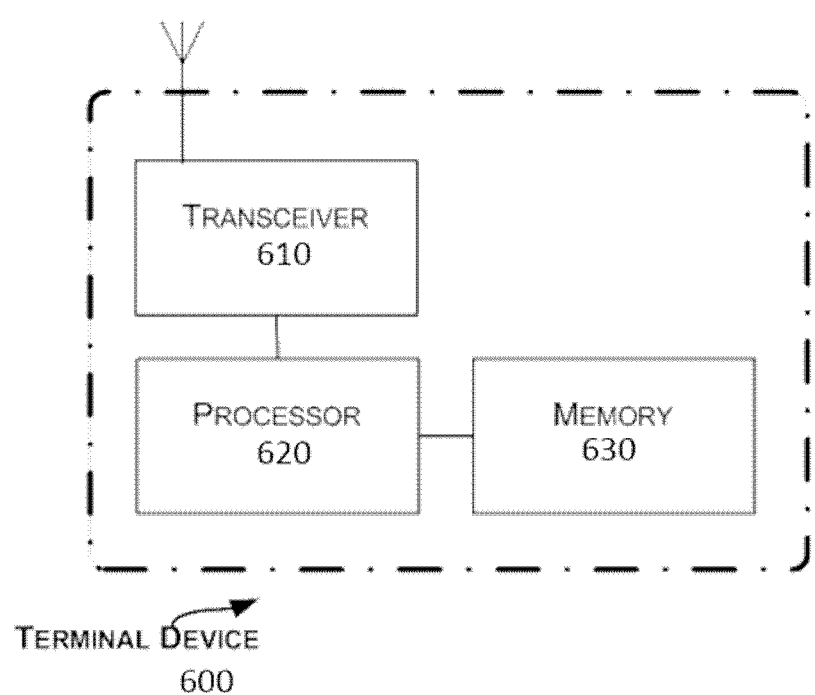
FIG. 6 is a block diagram of a terminal device for hybrid automatic repeat request (HARQ) processes according to another embodiment of the present disclosure.

FIG. 6 is a block diagram of a terminal device for hybrid automatic repeat request (HARQ) processes according to another embodiment of the present disclosure. The terminal device 600 includes a transceiver 610, a processor 620 and a memory 630. The memory 630 contains instructions executable by the processor 620 whereby the terminal device 600 is operative to: send to a network device one or more data processing capacity indications indicating one or more data processing capabilities of the terminal device; receive hybrid automatic repeat request (HARQ) data; and allocate the hybrid automatic repeat request (HARQ) data to available soft buffers in the terminal device.

The present disclosure also provides at least one computer program product in the form of a non-volatile or volatile memory, e.g., an Electrically Erasable Programmable Read-Only Memory (EEPROM), a flash memory and a hard drive. The computer program product includes a computer program. The computer program includes: code/computer readable instructions, which when executed by the processor 520 causes the network device 500 to perform the actions, e.g., of the procedure described earlier in conjunction with FIG. 3*a* and FIG. 3*b*; or code/computer readable instructions, which when executed by the processor 620 causes the terminal device 600 to perform the actions, e.g., of the procedure described earlier in conjunction with FIG. 3*a* and FIG. 3*b*.

The computer program product may be configured as a computer program code structured in computer program modules. The computer program modules could essentially perform the actions of the flow illustrated in FIG. 2 or FIG. 4.

The processor may be a single CPU (Central processing unit), but could also comprise two or more processing units. For example, the processor may include general purpose microprocessors; instruction set processors and/or related chips sets and/or special purpose microprocessors such as Application Specific Integrated Circuit (ASICs). The processor may also comprise board memory for caching purposes. The computer program may be carried by a computer program product connected to the processor. The computer program product may comprise a computer readable medium on which the computer program is stored. For example, the computer program product may be a flash memory, a Random-access memory (RAM), a Read-Only Memory (ROM), or an EEPROM, and the computer program modules described above could in alternative embodiments be distributed on different computer program products in the form of memories.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device for hybrid automatic repeat request (HARQ) processes, comprising:
   receiving from a terminal device one or more data processing capacity indications indicating at least a number of soft buffers for buffering HARQ data and processing delay to process HARQ data at the terminal device;
   estimating a number of available soft buffers made available from decoding one or more HARQ data in the terminal device, the estimating based on the one or more data processing capacity indications; and
   scheduling further HARQ data to overuse the soft buffers according to the estimated number of available soft buffers.

2. The method of claim 1, wherein the scheduling of the further HARQ data to overuse the soft buffers allows for more HARQ data than the number of soft buffers at the terminal device.

3. A method in a terminal device for hybrid automatic repeat request (HARQ) processes, comprising:
   sending to a network device one or more data processing capacity indications indicating at least a number of soft buffers for buffering HARQ data and processing delay to process HARQ data at the terminal device, wherein the network device uses the one or more data processing capacity indications to estimate a number of available soft buffers made available from decoding one or more HARQ data in the terminal device, and schedules further HARQ data to overuse the soft buffers according to the estimated number of available soft buffers;
   receiving the further HARQ data; and
   allocating the further HARQ data to available soft buffers in the terminal device.

4. The method of claim 3, wherein the schedule of the further HARQ data to overuse the soft buffers allows for more HARQ data than the number of soft buffers at the terminal device.

5. A network device for hybrid automatic repeat request (HARQ) processes, comprising:
   a processor; and
   a memory, said memory containing instructions which, when executed by said processor, cause the network device to:
   receive from a terminal device one or more data processing capacity indications indicating at least a number of soft buffers for buffering HARQ data and processing delay to process HARQ data at the terminal device;
   estimate a number of available soft buffers made available from decoding one or more HARQ data in the terminal device, the estimate based on the one or more data processing capacity indications; and
   schedule further HARQ data to overuse the soft buffers according to the estimated number of available soft buffers.

6. The network device of claim 5, wherein the schedule of the further HARQ data to overuse the soft buffers allows for more HARQ data than the number of soft buffers at the terminal device.

7. A terminal device for hybrid automatic repeat request (HARQ) processes, comprising:
   a processor; and
   a memory, said memory containing instructions which, when executed by said processor, cause the terminal device to:
   send to a network device one or more data processing capacity indications indicating at least a number of soft buffers for buffering HARQ data and processing delay to process HARQ data at the terminal device, wherein the network device uses the one or more data processing capacity indications to estimate a number of available soft buffers made available from decoding one or more HARQ data in the terminal device, and schedules further HARQ data to overuse the soft buffers according to the estimated number of available soft buffers;
   receive the further HARQ data; and
   allocate the further HARQ data to available soft buffers in the terminal device.

8. The terminal device of claim 7, wherein the schedule of the further HARQ data to overuse the soft buffers allows for more HARQ data than the number of soft buffers at the terminal device.

9. A system in network for hybrid automatic repeat request (HARQ) processes, comprising:
   a terminal device; and a network device, wherein the network device comprising a first processor and a first memory, said first memory containing first instructions which, when executed by said first processor cause the network device to:
   receive from a terminal device one or more data processing capacity indications indicating at least a number of soft buffers for buffering HARQ data and processing delay to process HARQ data at the terminal device;
   estimate a number of available soft buffers made available from decoding one or more HARQ data in the terminal device, the estimate based on the one or more data processing capacity indications; and
   schedule further HARQ data to overuse the soft buffers according to the estimated number of available soft buffers;
and wherein the terminal device comprising a second processor and a second memory, said second memory containing second instructions which, when executed by said second processor cause the terminal device to:
   send to the network device the one or more data processing capacity indications;
   receive the further HARQ data; and
   allocate the further HARQ data to the available soft buffers in the terminal device.

10. The system of claim 9, wherein the schedule of the further HARQ data to overuse the soft buffers allows for more HARQ data than the number of soft buffers at the terminal device.

11. A non-transitory computer readable storage medium storing computer program instructions which, when executed on a processor in a terminal device for hybrid automatic repeat request (HARQ) processes, cause the terminal device to perform operations comprising:
   sending to a network device one or more data processing capacity indications indicating at least a number of soft buffers for buffering HARQ data and processing delay to process HARQ data at the terminal device, wherein the network device uses the one or more data processing capacity indications to estimate a number of available soft buffers made available from decoding one or more HARQ data in the terminal device, and schedules further HARQ data to overuse the soft buffers according to the estimated number of available soft buffers;
   receiving the further HARQ data; and
   allocating the further HARQ data to available soft buffers in the terminal device.

12. The non-transitory computer readable storage medium of claim 11, wherein the schedule of the further HARQ data to overuse the soft buffers allows for more HARQ data than the number of soft buffers at the terminal device.

* * * * *